United States Patent [19]

Hanagan

[11] 4,125,285

[45] Nov. 14, 1978

[54] TWO PIECE MOTORCYCLE SEAT FRAME CONSTRUCTION

[75] Inventor: Michael W. Hanagan, Somers, Conn.

[73] Assignee: Corbin Gentry, Inc., Somersville, Conn.

[21] Appl. No.: 827,542

[22] Filed: Aug. 25, 1977

[51] Int. Cl.² ............................................. B62J 1/00
[52] U.S. Cl. .................................. 297/195; 297/243; 297/452
[58] Field of Search ............... 297/195, 243, 451, 449, 297/444, 445, DIG. 9, 452

[56] References Cited

U.S. PATENT DOCUMENTS

| | | | |
|---|---|---|---|
| 3,269,773 | 8/1966 | O'Connor | 297/243 X |
| 3,336,078 | 8/1967 | Haley | 297/445 X |
| 3,352,570 | 11/1967 | Cordrey | 297/195 X |
| 3,788,701 | 1/1974 | Massaccesi | 297/449 X |
| 3,807,800 | 4/1974 | Morrison et al. | 297/452 |
| 3,873,155 | 3/1975 | Barecki | 297/445 |

*Primary Examiner*—Francis K. Zugel

[57] ABSTRACT

A motorcycle seat includes a metallic base, a separately formed back rest member of generally L-shaped configuration and a pair of generally L-shaped support rods. These are assembled with the support rods and horizontal portion of the back rest member disposed upon the upper surface of the base and secured thereto, and the rods are also secured to the upstanding portion of the back rest member. Cushion means is disposed upon the base and back rest members and includes a cover extending over the back rest member. The back rest member has a concave transverse cross section and is provided with a multiplicity of recesses in the rearward surface thereof in which buttons disposed on the rearward surface of the cover are substantially disposed.

11 Claims, 7 Drawing Figures

TWO PIECE MOTORCYCLE SEAT FRAME CONSTRUCTION

BACKGROUND OF THE INVENTION

Owners of motorcycles frequently desire to customize the appearance of their vehicles or to improve the comfort provided by the seats. As a result, they often purchase custom seat structures which meet their own personal preferences. This has produced a demand for manufacturers of custom seats who in turn have been forced to increase the number of models which they manufacture and inventory.

The situation with respect to those seats providing a back rest becomes particularly acute in that the customary technique in forming the metal support structure has involved the stamping or bending of a single sheet of metal into a configuration providing both the base portion and the back rest portion. Even when substantial flanges and corrugations have been provided, there have been occasional problems with respect to maintaining rigidity and structural strength. The preferred back rest frame constructions presently employ support rods which are welded to the seat or base portion and to the back portion so as to reinforce the sheet metal structure; however, such assemblies encounter certain limitations in design.

Another problem frequently encountered in seats having back rest structures is that of providing buttons upon the rear surface of the back rest to limit relative movement of the cover and to improve the appearance thereof. Such buttons have heretofore projected substantially outwardly of the plane defined by the cover and have been susceptible to inadvertent engagement with other objects and resultant tearing from the back rest.

It is an object of the present invention to provide a novel motorcycle seat including a back rest in which the frame may be readily and economically fabricated and assembled to provide a rugged and rigid structure.

It is also an object to provide such a seat assembly in which the configuration and dimensioning of the components may be readily varied, thus minimizing the required inventory of parts and increasing the possible configurations resulting from several components.

Another object is to provide such a seat in which the buttons upon the rear surface of the back rest are substantially recessed so as to minimize the likelihood of inadvertent disengagement therefrom.

A further object is to provide a simple and effective method for producing such seats from easily formed and relatively inexpensive components.

SUMMARY OF THE INVENTION

It has now been found that the foregoing and related objects may be readily attained in a motorcycle seat having a metallic base extending generally in a horizontal plane with a top wall and a sidewall extending downwardly therefrom. This base has forward and rearward ends and includes means for attachment to a motorcycle frame. A separate back rest member is disposed at the rearward end of the base and has a horizontal portion extending forwardly along the top wall of the base and it also has an upstanding portion extending upwardly from the rearward end of the base.

A pair of transversely spaced, parallel extending support rods are disposed upon the metallic base and back rest member with a generally horizontally extending portion extending forwardly along the top wall of the base and the horizontal portion of the back rest member. These rods have a generally upstanding extending portion extending along the forward face of the upstanding portion of the back rest member. Means is provided to secure the rods and the back rest member to each other and to the top wall of the base. Cushion means is provided on the base and back rest member and includes resilient material on the upper surface of the base and the forward surface of the back rest member and a cover which extends over the resilient material and the back rest member.

In the preferred seat, the back rest member upstanding portion has a concavely arcuate transverse cross section with the arc of the cross section opening forwardly of the seat. In addition, it is provided with a multiplicity of spaced recesses in the rearward surface thereof and the cushion means includes button members having stems projecting through apertures on the cover overlying the rearward surface of the back rest member with the buttons seating in these recesses. In the most desirable form of the assembly, insert elements are seated in the apertures and recesses of the back rest member which underlie the cover and buttons.

In its preferred form, the seat has the support rods extending along the upper surface of the horizontal portion of the back rest member and the support rods are of greater length than the horizontal portion so as to extend forwardly thereof along the surface of the base. Protector strips are provided about the edges of the back rest and base members to minimize abrasion of the cover as it extends thereabout.

In the method for making the seat, a length of sheet metal is formed into a base having a top wall and a sidewall extending downwardly therefrom with the base having forward and rearward ends. A second length of sheet metal is separately formed into a back rest member having a generally L-shaped configuration defined by a pair of arm portions with one arm portion being of relatively short length and narrow width and the other arm portion being of substantially greater length and width.

A pair of support rods are formed into generally L-shaped configuration with the included angle thereof closely approximating the included angle defined by the back rest member. The rods and the back rest member are secured to each other and to the upper surface of the top wall of the base so that the wide arm of the back rest member and one arm of the rods extend upwardly from the rearward end of the base and the relatively narrow arm of the back rest member and the other arm of the rods extend forwardly along the top wall of the base. Cushion means are then secured to the base and back rest member and include resilient material on the upper surface of the base and the forward surface of the back rest member and a cover extending over the resilient material on the base and over the upstanding portion of the back rest member.

In its preferred aspect, the back rest member is formed with the dimples and apertures hereinbefore described and the buttons are seated in the recesses so as to lie substantially within the plane defined by the major surface of the cover on the rearward surface of the upstanding portion of the back rest member.

DETAILED DESCRIPTION OF THE ILLUSTRATED EMBODIMENTS

Figure 1:
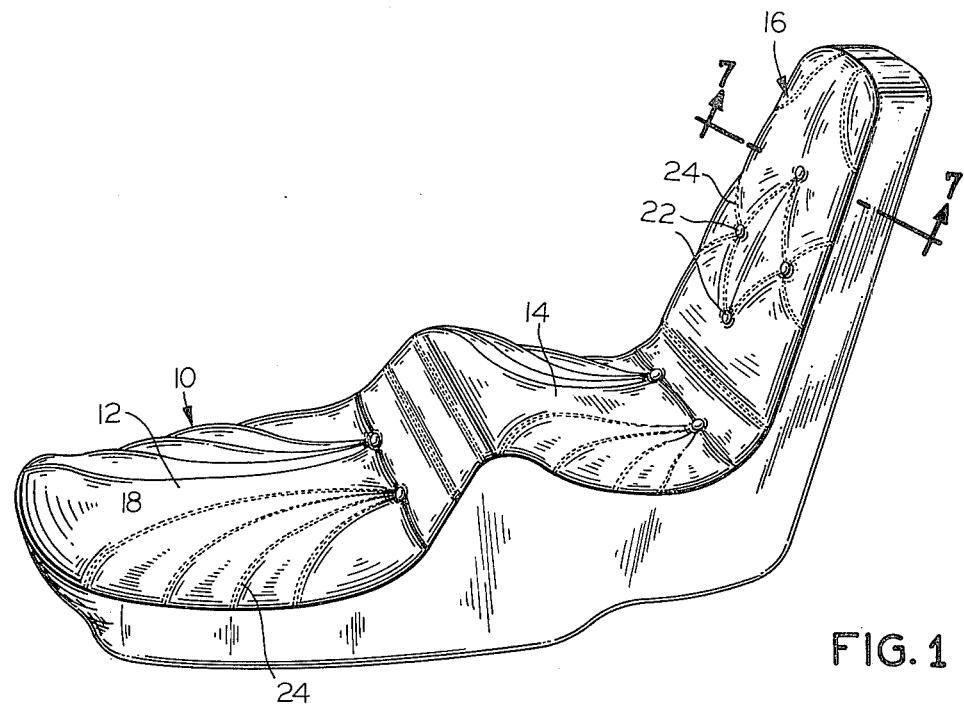
FIG. 1 is a perspective view of a motorcycle seat embodying the present invention.
Figure 2:
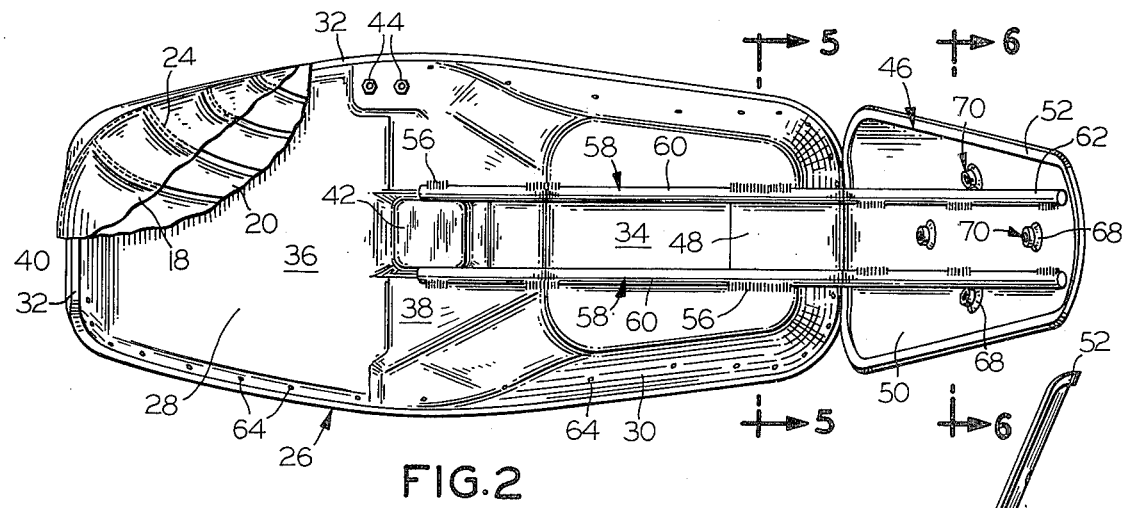
FIG. 2 is a plan view thereof with the resilient material and the cover broken away so as to reveal underlying construction.

Turning now to the attached drawings in detail, FIGS. 1 and 2 illustrate a seat embodying the present invention designed to seat both the driver and a passenger. As seen, the seat therefore includes a seat section generally designated by the numeral 10 comprised of the main seat portion 12 and the passenger seat portion 14 and it also includes a back rest portion generally designated by the numeral 16. As best seen in FIG. 2, the seat is provided by a frame assembly to be described in greater detail hereinafter, upon which is supported resilient material 20, such as a polyurethane foam, and encases by the cover 18 of flexible material. A multiplicity of buttons 22 are provided on the back rest section 16, and simulated stitching 24 is utilized to provide an attractive appearance.

As seen in FIGS. 2-6, the frame assembly for the seat includes a metallic base generally designated by the numeral 26 and having a top wall 28 and sidewall 30 extending downwardly thereabout. The top wall 28 is contoured during the forming operation so as to provide an elevated passenger portion 34 adjacent its rearward end, a main or driver portion 36 at a lower level and an upwardly and rearwardly sloping transitional portion 38. In addition, the contouring of the top wall provides an upstanding front lip portion 40 and an upstanding central portion 42 in the transitional portion 38. Fasteners 44 (only in part shown) are used for securing the base 26 and thereby the seat to the chassis of the motorcycle.

Figure 3:
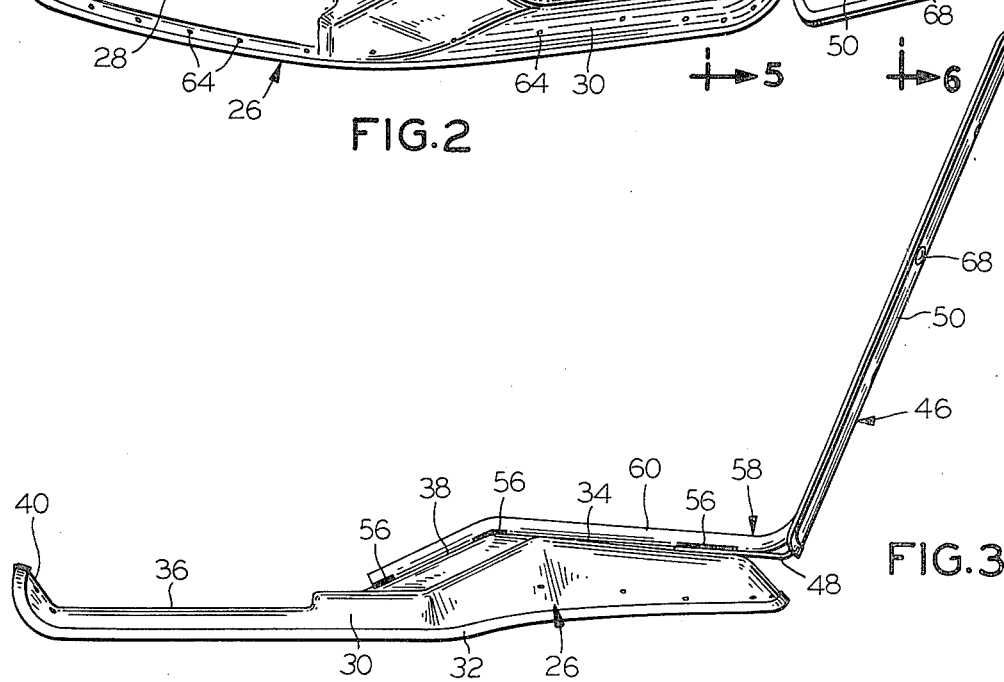
FIG. 3 is a side elevational view of the frame for the seat of FIG. 1.
Figure 4:
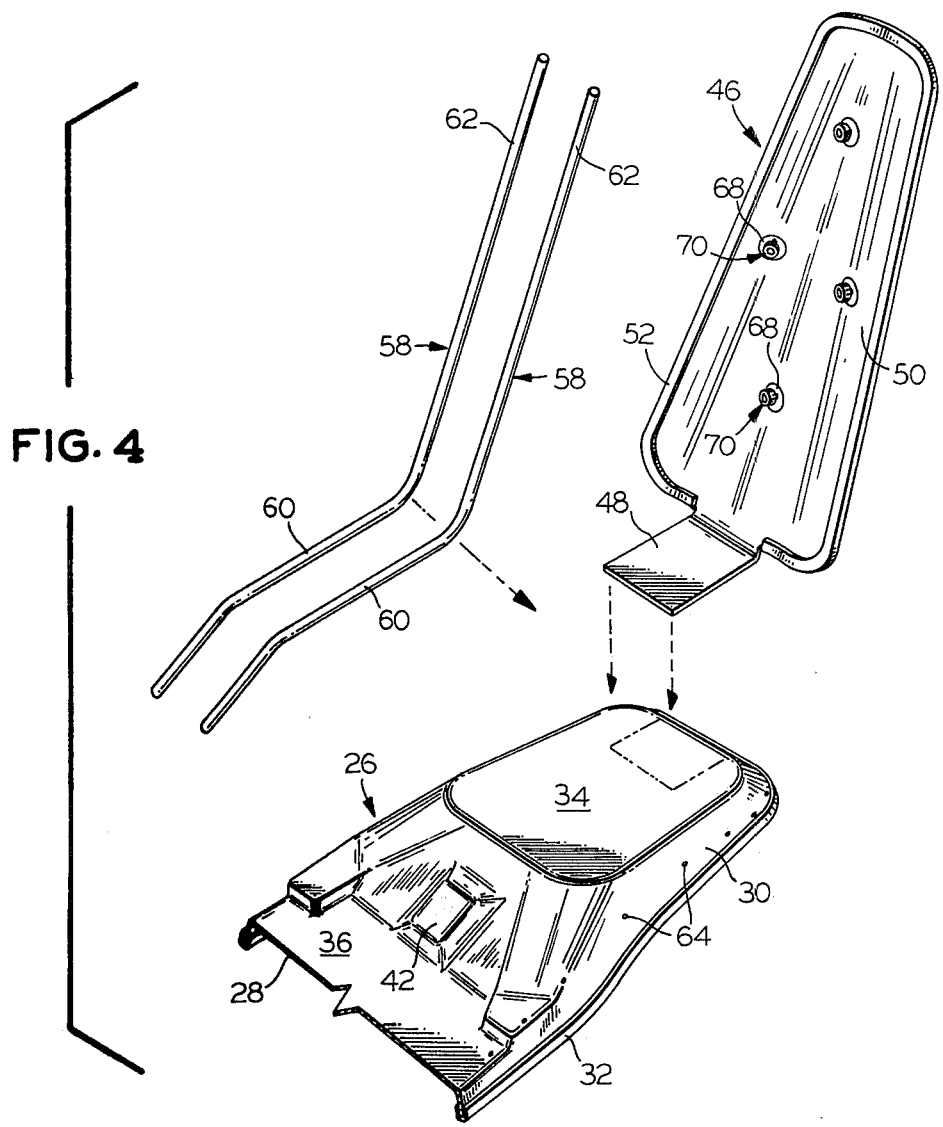
FIG. 4 is a partially exploded view of the frame of FIG. 3 with the forward portion of the base broken away.
Figure 5:
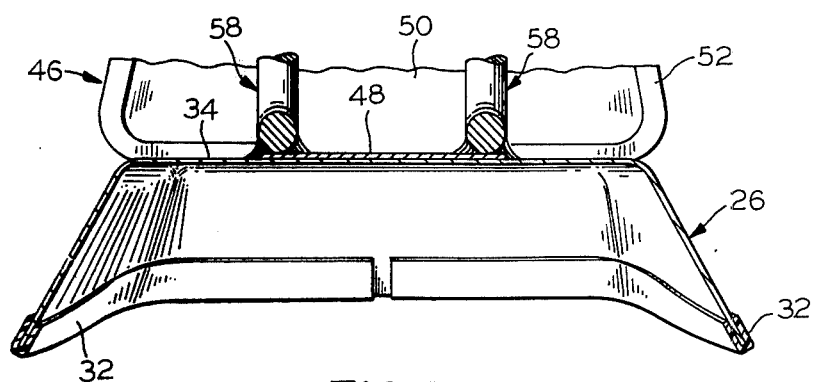
FIG. 5 is a fragmentary sectional view to an enlarged scale along the line 5—5 of FIG. 2.

The frame assembly also incudes a generally L-shaped back rest member generally designated by the numeral 46 and having a horizontal portion 48 of relatively short length and narrow width extending along the upper surface of the passenger portion 34 of the top wall 28 of the base 26 and extending somewhat rearwardly thereof as best seen in FIG. 3. The back rest member 46 also has an upstanding portion 50 of substantially greater width and length than the horizontal portion 48 as is clearly seen in FIGS. 2 and 4. The lower end of the upstanding portion 50 is of substantially the same width as the rearward end of the base 26, and the upstanding portion 50 tapers to a reduced width at its upper end.

Each of a pair of generally L-shaped support rods generally designated by the numeral 58 has an elongated generally horizontal portion 60 extending along the horizontal portion 48 of the back rest member 46 and the top wall 28 throughout the length of the passenger portion 34 and most of the transitional portion 38. As seen, the dimensioning of the horizontal portion 48 of the back rest member 46 and of the central portion 42 of the top wall 28 of the base 26 is substantially the same so that the support rods 58 extend along the opposite sides of the central portion 42. The support rods 58 also have an upstanding portion 62 which extends along the front face of the upstanding portion 50 of the back rest member 46 throughout substantially its entire height.

The several elements of the frame assembly are secured together by weldments indicated by the numeral 56 which secure the support rods 58 to the upstanding portion 50 of the back rest member 46 and to the horizontal portion 48 of the back rest member 46 and to the top wall 28 of the base 26, thus providing a rigid assembly.

Extending about the side and upper edges of the upstanding portion 50 of the back rest member 46 and about the edges of the sidewall 30 of the base 26, are channel-shaped protector strips 52 and 32, respectively, of synthetic resin which provide a smooth relatively low abrasion edge surface for forming the cover 18 thereabout. In addition, the base 26 has apertures 64 spaced along the side and front margins thereof for receiving rivets (not shown) inserted through the cover 18 on the undersurface thereof so as to secure the cover 18 thereto.

Figure 6:
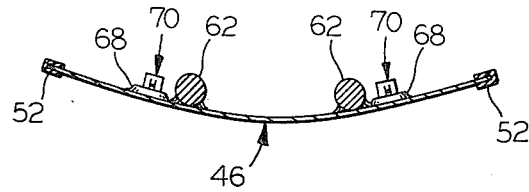
FIG. 6 is a sectional view to an enlarged scale along the line 6—6 of FIG. 2.
Figure 7:
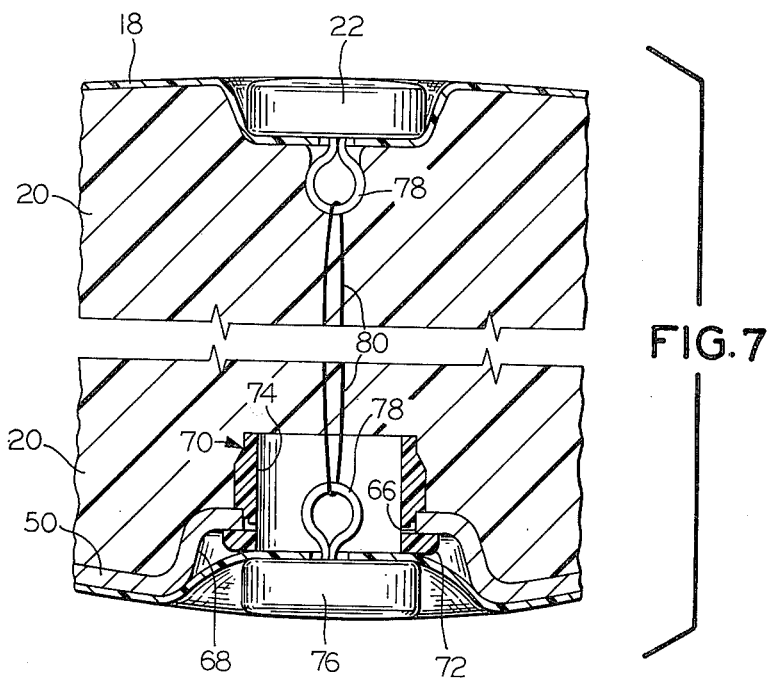
FIG. 7 is an enlarged fragmentary cross section along the line 7—7 of FIG. 1.

As best seen in FIGS. 6 and 7, the upstanding portion 50 of the back rest member 46 is formed so as to be concavely arcuate in its transverse dimension, thus providing an arc which opens forwardly of the seat and defines a recess at least substantially equal in depth to the diameter of the support rods 58. In addition, the upstanding portion 50 is provided with a series of spaced apertures 66 and the metal thereabout is deformed forwardly so as to provide dish-shaped recesses or dimples 68 opening rearwardly of the back rest member 46.

Inserted into the apertures 66 are insert elements 70 having a peripheral collar 72 which seats in the recess of dimple 68 and a resiliently deformable shank 74 which extends through the aperture 66 and engages therein. Upon assembly of the cover 18, onto the back rest member 46, a button 76 having a stem 78 of wire or the like is disposed over the insert element 70 and its stem 78 is passed through an aperture in the cover 18 and through the core of the insert element 70 so as to project into the resilient material 20. Another button 22 having a similar stem 78 is placed upon the front surface of the cover 18 in alignment therewith, and the two stems 78 are tightly drawn and secured together by a cord 80. Thus, it can be seen that the button 70 on the rear surface of the back rest portion 16 does not project substantially beyond the plane of the surrounding cover 18, thus minimizing the likelihood that it will be caught and inadvertently torn therefrom.

In assembling the seats of the present invention, the base 26 is formed from sheet metal so as to provide the various contours in the top wall 26 thereof and so as to form the sidewall 30 and front lip portion 40. The various apertures 64 for the rivets and the apertures for the fasteners 44 are also formed therein.

The back rest member 46 is separately formed in its L-shaped configuration and the apertures 66 and dimples 68 are conveniently formed as a part of a single punching operation. Similarly, the support rods 58 are formed into their L-shaped configuration conforming substantially to the included angle between the horizontal portion 48 and the upstanding portion 50 of the back rest member 46.

The several elements thus formed are conveniently assembled in a jig so that the support rods 58 extend along the side margins of the horizontal portion 48 of the back rest member 46 and of the central portion 42 of the base 26. A series of weldments 56 are then made so as to secure the several components in rigid assembly.

Following this assembly, the protective strips 32,52 are slipped over the edges of the base 26 and back rest member 46. The insert elements 70 are inserted into the apertures 66 and seated therein with the collars 72 disposed within the dimples 68.

In the next step, the resilient material 20 is disposed over the upper surface of the base 26 and the forward surface of the back rest member 46, and the back rest portion of the cover 18 is slid downwardly over the back rest member 46 and its associated reslient material 20. The portion of the cover 18 encasing the seat section 10 is then formed about the resilient material 20 and folded under the base member 26 and secured thereto by rivets (not shown) seated in the apertures 64.

The buttons 76 are then secured to the back surface of the back rest portion 16 by inserting the stems 78 through apertures in the cover 18 and through the cores in the shanks 74 of the insert elements 70. Similar buttons 76 are aligned on the front surface of the back rest section 16 and cords 80 are looped about the cooperating stems and used to draw the buttons of each cooperating pair tightly together and to secure them in position.

Since the back rest member is separately formed from the base, it can be seen that a single base can be used with various configurations and sizes of back rest members, thus minimizing inventory requirements and permitting greater flexibility in design. Moreover, the formaton of the back rest member as a separate element also permits elimination of unnecessary material and scrap and it also permits facile formation of the back rest member with the highly desirable concave recesses and dimples to facilitate formation of the seat assembly.

Still another advantage is obtained by having the horizontal portion of the back rest member overlap the top surface of the base, thereby providing a highly rigid assembly in combination with the support rods.

It will be appreciated that both the base and the back rest member may have configurations and dimensions differing significantly from those specifically illustrated. It will also be appreciated that the support rods may extend even furthere along the top surface of the base. Moreover, if so desired, additional support rods may be employed and the rods may be formed of rectangular bar stock rather than the cylindrical stock. It will also be appreciated that various mechanical fasteners may be used in conjunction with, or in place of, the weldments to secure the several components in rigid assembly.

Having thus described the invention, I claim:

1. In a motorcycle seat, the combination comprising:
   A. a metallic base extending generally in a horizontal plane and having a top wall and a sidewall extending generally downwardly therefrom, said base having forward and rearward ends and including means for attachment to a motorcycle frame;
   B. a metallic back rest member at the rearward end of said base and having a horizontal portion extending forwardly along said top wall of said base and an upstanding portion extending upwardly from the rearward end of said base;
   C. a pair of transversely spaced, parallel extending support rods having a generally horizontally extending portion extending forwardly along said top wall of said base and said horizontal portion of said back rest member, said rods also having a generally upwardly extending portion extending along the forward face of said back rest member upstanding portion;
   D. means securing said rods and said back rest member to each other and to said top wall of said base; and
   E. cushion means on said base and back rest member including resilient material on the upper surface of said base and the forward surface of said back rest member, and a cover extending over said cushion means on said base and over said back rest member.

2. The motorcycle seat in accordance with claim 1 wherein said back rest member upstanding portion has a concavely arcuate transverse cross section, the arc of said cross section opening forwardly of said seat.

3. The motorcycle seat in accordance with claim 1 wherein said back rest member upstanding portion has a multiplicity of spaced recesses in the rearward surface thereof.

4. The motorcycle seat in accordance with claim 3 wherein said cushion means includes button members having stems projecting through apertures in said cover overlying the rearward surface of said back rest member, said buttons seating in said recesses of said back rest member.

5. The motorcycle seat in accordance with claim 3 wherein inserts are secured in apertures of said back rest member upstanding portion disposed in said recesses and said stems extend through the cores thereof and beyond the forward surface of said back rest member.

6. The motorcycle seat in accordance with claim 1 wherein said support rods extend along the upper surface of said horizontal portion of said back rest member.

7. The motorcycle seat in accordance with claim 6 wherein said horizontal portions of said support rods are of greater length than said horizontal portion of said back rest member so as to extend forwardly thereof along the surface of said base.

8. The motorcycle seat in accordance with claim 1 wherein said base and said upstanding portion of said back rest member have protector strips along peripheral edges thereof.

9. The motorcycle seat in accordance with claim 1 wherein said means securing said rods and said back rest member to each other and to said to wall of said base includes weldments.

10. The motorcycle seat in accordance with claim 1 wherein said back rest member upstanding portion has an arcuate transverse cross section providing a concave recess opening forwardly of said seat, and wherein said back rest member upstanding portion has a multiplicity of spaced recesses in the rearward surface thereof.

11. The motorcycle seat in accordance with claim 10 wherein said cushion means includes button members having stems projecting through apertures in said cover and overlying the rearward surface of said fack rest member, said buttons seating in the recesses of said back rest member.

* * * * *